United States Patent
Bax (12)

(10) Patent No.: US 6,445,556 B1
(45) Date of Patent: Sep. 3, 2002

(54) VOLTAGE PROTECTION FOR COMPUTER PROCESSORS

(75) Inventor: Daniel H. Bax, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/577,237

(22) Filed: May 23, 2000

(51) Int. Cl.[7] .................................................. H02H 9/00
(52) U.S. Cl. .......................... 361/91.1; 361/90; 361/78; 361/18
(58) Field of Search ............................... 307/43, 71, 75, 307/85; 324/537; 361/56, 60, 78, 79, 90, 91.1, 18

(56) References Cited

U.S. PATENT DOCUMENTS 5,632,039 A * 5/1997 Walker et al. ............... 395/750
5,841,287 A * 11/1998 Duley ......................... 324/537
5,926,032 A * 7/1999 Gebara et al. ................ 326/30

* cited by examiner

*Primary Examiner*—Stephen W. Jackson
(74) *Attorney, Agent, or Firm*—Pryor A. Garnett

(57) ABSTRACT

A multi processor computer system includes processors 102 in processor receptacles 104, and voltage modules 106 and voltage module receptacle 108. The system accepts both direct voltage processors powered directly from the system power plane, and regulated voltage processors which require a voltage regulator 300. The regulated voltage processors require the voltage regulator while the direct voltage processors cannot operate with a voltage regulator. Voltage module control circuit 110 tests and compares processor type signals from the processor receptacles and voltage module type signals from the voltage module receptacles, and produces a voltage validation signal which indicates the presence of a mismatch between any of the processors and its respective voltage module. The voltage validation signal modifies the conventional processor presence signal from the processor receptacles if a mismatch exists, preventing the system from being powered on.

13 Claims, 2 Drawing Sheets

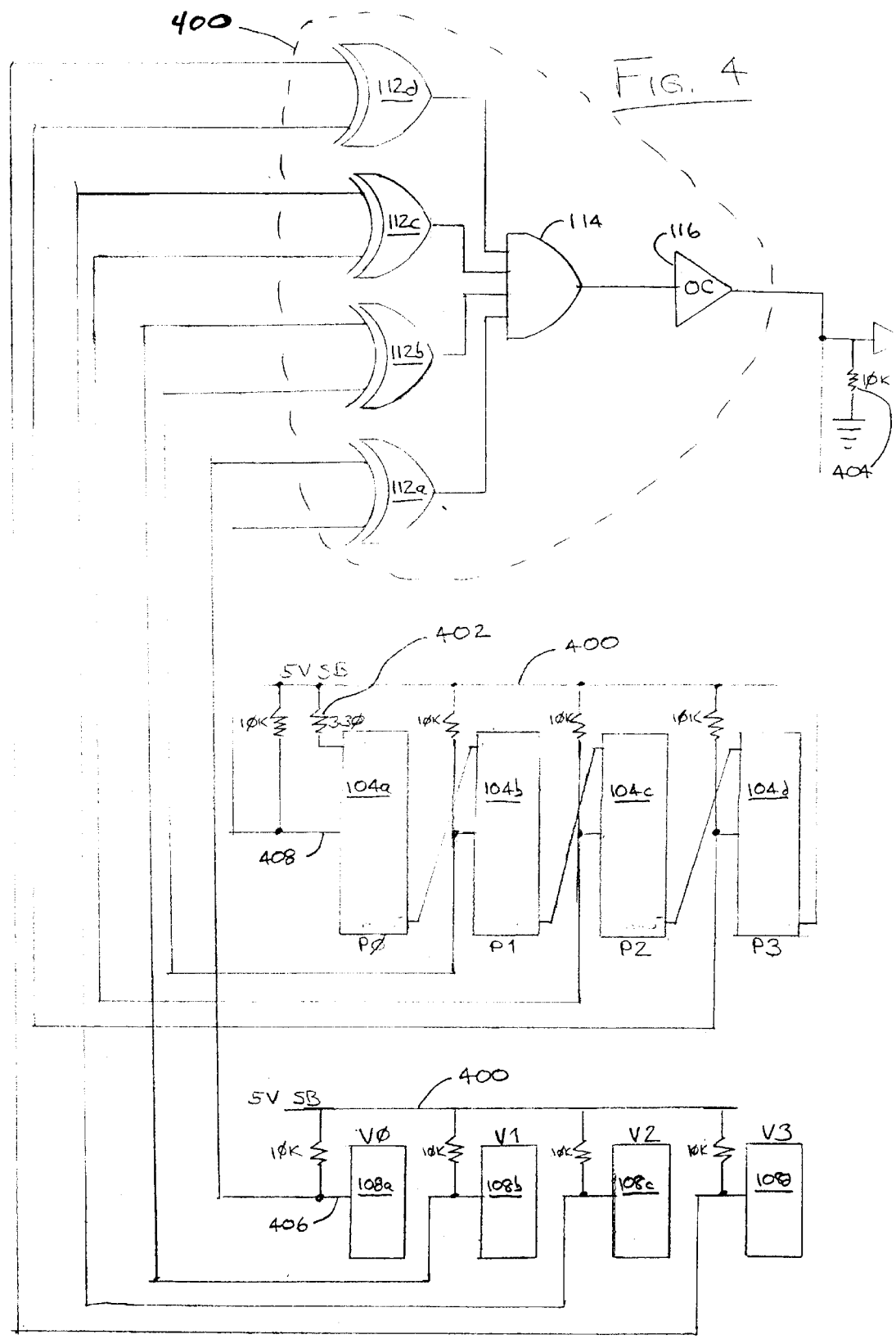

VOLTAGE PROTECTION FOR COMPUTER PROCESSORS

BACKGROUND OF THE INVENTION

1. Technical Field

This invention relates to computer systems having processors which can be damaged or destroyed by the application of an incorrect power input voltage.

2. Description of the Prior Art

The processor is the "brain" of a computer system, performing all calculations and other data manipulation under the control of application and operating system software. The processor is usually the single most expensive component of a computer system, and damage to or destruction of the processor during manufacturing, testing or operation is a very expensive mistake.

Each processor requires that the computer system provide electrical power to the processor at a specific voltage, and application of the incorrect voltage to the processor often damages or destroys the processor. Visually identical processors can require different input voltages, creating a danger of a mismatch between the input voltage expected by the processor and the voltage provided to the processor by the computer system.

Some processors, such as the Intel Pentium™ series processors, provide a signal to the computer system identifying the power input voltage required by the processor, and require a voltage regulator to interpret the processor voltage signal provided by the processor and supply the appropriate power input voltage to the processor. Such processors can be termed "regulated voltage processors". A regulated voltage processor will be damaged or destroyed if connected to a computer system not having a voltage regulator.

Other processors, such as certain Intel Pentium III Xeon™ processors, are designed for use without a voltage regulator, receiving input power from the computer system's power plane without an intermediate voltage regulator. Such processors can be termed "direct voltage processors". A direct voltage processor may be damaged or destroyed if connected to a computer system having a voltage regulator connected between the processor and the computer system's power plane.

There is a need for a computer system which detects mismatches between processors and voltage regulators, in order to avoid the expensive mistake of damaging or destroying the processor by application of the wrong power input voltage.

SUMMARY OF THE INVENTION

This invention comprises a computer system with at least one processor which requires a power input voltage identified by a processor type signal from the processor. A voltage module in the system provides a power supply voltage which must match the processor's power input voltage to avoid damaging or destroying the processor. The processor type signal and the voltage module provide inputs to a voltage module validator which determines whether the power supply voltage matches the power input voltage. The system's power controller for powering up on the system is responsive to the voltage module validator. Preferably, the processor and voltage module are removable, and the system further includes a processor receptacle and a voltage module receptacle. Further, the system may include a second processor and voltage module. The voltage module is preferably either a direct voltage module which provides the system power plane voltage directly to the processor, or a voltage regulation module such as a voltage regulator.

By providing a voltage module validator in the system, the invention protects against powering up the system with a voltage module that does not match the processor type and that would damage or destroy the processor if the system were powered up. The preferable use of receptacles for the processor and voltage module permit a single system embodiment which can accept both direct and regulated voltage processors and direct and regulated voltage modules.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 is an electrical schematic diagram of the processor receptacles, voltage module receptacles, and voltage module control circuit of the system of FIG. 1.

DESCRIPTION OF THE PREFERRED EMBODIMENT

Overview

Figure 1:
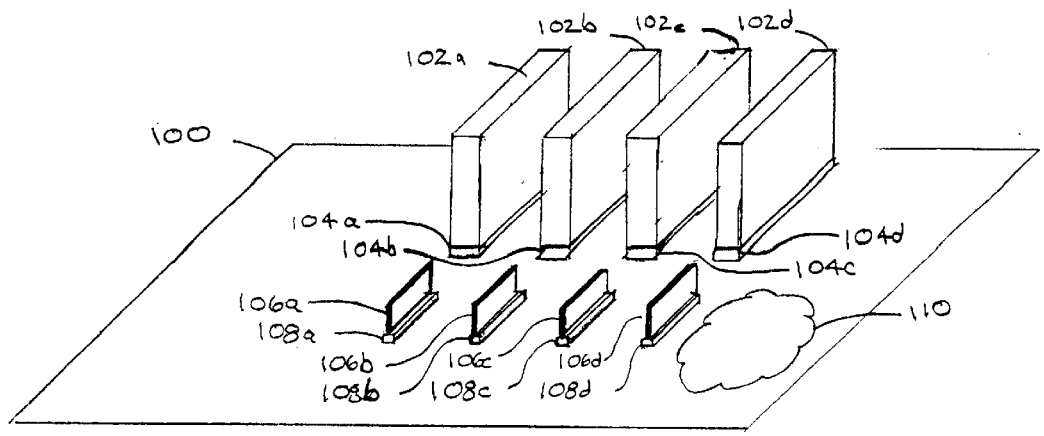
FIG. 1 is an isometric block diagram of a computer system including processors, voltage modules, and a voltage module control circuit according to the preferred embodiment of the invention.

FIG. 1 shows a computer system 100 with four processors 102a–d (collectively 102) with respective voltage modules 106a–d (collectively 106). The processors are removable, and are inserted into processor receptacles 104a–d (collectively 104). Similarly, the voltage modules 106a–d are inserted into respective voltage modules receptacles 108a–d (collectively 108).

The processor receptacles 104 can accept multiple, contact-compatible processors, some of which are direct voltage processors powered directly from the power plane of the system 100, and others of which are regulated voltage processors requiring a voltage regulation. Similarly, the voltage module receptacles 108 can accept multiple, contact-compatible voltage modules, including a direct voltage module 200 and a voltage regulator module 300. As explained above, a mismatch between a processor 102 and its corresponding voltage module 106 can damage or destroy the processor when the system 100 is powered on.

The invention adds voltage module control circuit 110 to the existing power enablement circuit of the system to identify such voltage mismatches and prevent power-on of the system 100 when such a mismatch is detected. Conventional system power enablement logic, which conventionally detects only the presence or absence of processors 102 in the processor receptacles 104, is modified by the voltage module control circuit 110 to additionally detect mismatches between the processors 102 and their respective voltage modules 106.

Processors 102

Regulated voltage processors require voltage regulation between the processor and the power plane of the system

100. The system 100 accepts the Intel Pentium II Xeon™ and certain Intel Pentium III™ Xeon™ regulated voltage processors. Those processors 102 are removably mounted in processor receptacles 104 which are preferably AMP part no. 767225-3. B1 and A165 of those processors 102 and processor receptacles 104 can be used by the system 100 to detect the presence or absence of the processor in the receptacle. If the receptacle 104 is empty, no connection is made between contacts B1 and A165. However, if the processor 102 is in the receptacle 104, the processor connects contact B1 to contact A165. The corresponding voltage module 106 for these regulated voltage processors is preferably the Lucent Technologies, Inc. Titania™ brand voltage regulation module (Lucent part no. PHE16CDAA), the voltage module receptacle 108 are preferably AMP part no. 1-145459-8.

Direct voltage processors 102 can be used in the system 100 of this invention as well, provided that those processors are designed to accept as input voltage the voltage provided by the system's power plane. The system 100 preferably accepts certain Intel Pentium™ Xeon™ direct voltage processors which expect a power input voltage of 5V or 12V. The power plane of the preferred embodiment provides power at 12V. For these direct voltage processors 102, no voltage regulation is needed between the processor and the system's power plane. The voltage receptacle 108 corresponding to such a direct voltage processor is filled with a direct voltage module 200 which directly connects the voltage supply to that processor with the power plane of the system 100.

Processor Receptacles 104

FIG. 4 shows the processor receptacles 104, the voltage module receptacles 108, and the voltage module control circuit 110 in schematic form. Contacts B1 and A165 of each processor receptacle 104 are conventionally used to detect the presence or absence of a processor 102 in the receptacle. Contact B1 of the first processor receptacle 104*a* is connected to the 5 volt standby power circuit 400, which provides 5V power while the system is powered off in "standby" mode. This connection is through a 330 ohm pull-up resistor 402. When a processor 102*a* is present in the first processor receptacle 104*a*, the processor directly connects contact B1 of that receptacle to contact A165 of the same receptacle, thereby providing the 5V standby voltage through contact B1 to contact A165. When no processor is present in the first processor receptacle 104A, contact A165 is not provided with the 5V standby voltage.

The second processor receptacle 104*b* has its contact B1 directly connected to contact A165 of the first processor receptacle 104*a*, such that if a processor is present in the first processor receptacle 104*a*, the 5V standby voltage is present at contact B1 of the second processor receptacle 104*b*. Then, if a processor 102 is present in receptacle in 104*b*, that same 5V standby voltage is connected through the processor to contact A165 of the second processor receptacle 104*b*. Similarly, the third processor receptacle 104*c* has its contact B1 directly connected to contact A165 of the second processor receptacle 104*b*, and the fourth and last processor receptacle 104*d* has its contact B1 directly connected to contact A165 of the third processor receptacle 104*c*. If processors are present in all four receptacles 104*a–d*, the 5V standby voltage is connected through the 330 ohm resistor 402 and each of the four processors 102*a–d* to produce a high (5V standby) processor presence signal at contact A165 of the fourth processor receptacle 104*d*. However, if any one of the processors is absent, the processor presence signal at contact A165 of the fourth processor receptacle 104*d* is low (ground). Contact A165 of the fourth processor receptacle 104*d* is then connected to a system service processor across a 10 K ohm pull-down resistor, such that if all four processors 103*a–d* are present the processor presence signal at contact A165 is pulled high to the 5V standby voltage, but if any of the four processors 102*a–d* are absent, the processor presence signal at contact A165 is pulled low to ground through the 10 K ohm resistor 404.

The use of contacts B1 and A165 low of the processors 102 and processor receptacles 104 to provide a processor presence signal is conventional. Voltage module control circuit 110 modifies the processor presence signal to also reflect mismatches between the processors 102*a–d* and their respective voltage modules 106*a–d*.

Direct Voltage Modules 200

Figure 2:
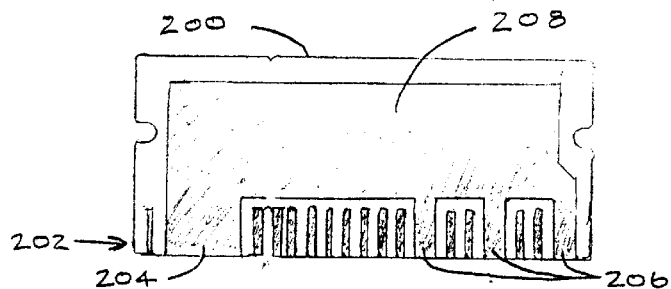
FIG. 2 is shows a direct voltage module used in the system of FIG. 1.

Direct voltage module 200 shown in FIG. 2 is a conventional printed circuit board having a double-sided, fifty contact edge connector 202. The edge connector 202 is inserted into and makes electrical contact with corresponding contacts in one of the voltage module receptacles 108. Input contacts 204 of direct voltage module 200 are connected through voltage module receptacle 108 to the power plane of the system 100. Multiple contacts are used because a single contact is not capable of carrying sufficient current to power the processor 102. Similarly, output contacts 206 of direct voltage module 200 are connected through voltage module receptacle 108 to the power input contacts of the respective processor receptacle 104, again to provide sufficient current at the power supply voltage to the processor 102.

Shunt 208 of the direct voltage module 200 directly connects input voltage contacts 204 to output voltage contacts 206 with no intervening voltage regulation circuitry. Thus, when direct voltage module 200 is in place in one of the voltage module receptacles 108*a–d*, the respective processor 102 is powered at a power supply voltage equal to the 12V voltage of the power plane of the system 100.

In the preferred embodiment, the input contacts 204 and output contacts 206 are on only one side of the circuit board. To prevent abrasion of contacts in the voltage module receptacle 108, the contact portions of the unused side of the circuit board of the direct voltage module 200 are plated, even though those contact areas are not used.

Voltage Regulation Module 300

Figure 3:
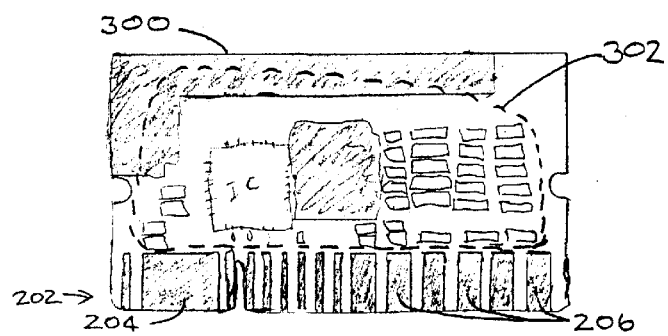
FIG. 3 shows a voltage regulation module used in the system of FIG. 1.

FIG. 3 shows conventional voltage regulation module 300 used in this invention, which is preferably a Lucent Technologies, Inc. Titania™ brand voltage regulator. The voltage regulation module 300 is inserted into and makes connections between the contacts of the same voltage module receptacle 108 which receives the direct voltage 200 described above. For this reason, the voltage regulator module 300 includes a double-sided, fifty contact edge connector 202 and receives input power through contacts 204, and provides output power for the processor through output contacts 206. Unlike direct voltage module 200, voltage regulator module 300 uses contacts on both sides of its printed circuit board. Voltage regulator module 300 further includes voltage regulator circuitry 302 for converting the input power provided at input power contacts 204, which is at the voltage of the power plane of the system 100, to an output power supply voltage at contacts 206 which is at the voltage specified by a processor voltage signal provided by the processor through the processor receptacle 104 to the voltage module receptacle 108.

Voltage Module Receptacle 108

At least one contact 406 of the voltage module receptacle 108 is conventionally expected by the voltage regulator module 300 to be at ground voltage. The preferred embodiment of this invention uses that contact 406 as a voltage module type contact to determine whether a voltage regulator module 300 or a direct voltage module 200 is present in the voltage module receptacle 108. As shown in FIG. 4, the voltage module type contact 406 of each voltage module receptacle 108 is connected to the 5V standby power supply 400 through a 10 K ohm pull-up resistor. The preferred voltage regulator module 300 connects the voltage module type contact 406 of the voltage receptacle 108 to ground. The direct voltage 200 of this invention does not connect the voltage module type contact 406 of the voltage module receptacle 108 to anything, thereby leaving the signal at the voltage module type contact pulled up to the 5V standby level (i.e., "floating" it). Thus, the signal at the voltage module type contact 406 of the voltage module receptacle 108 is high (5V standby) if a direct voltage module 200 is present in the receptacle or if the receptacle is empty, and is low when a voltage regulation module 300 is present in the receptacle.

The signals from the voltage module type contacts 406 of the voltage module receptacles 108 provide one half of the input signals to the voltage module control circuit 110.

Processor Receptacle 104a–d

The processors 102 used in the preferred embodiment of this invention use a processor type contact 408 to identify whether the processor is of the regulated voltage type or the direct connect type. The processor receptacle 104 connects the processor type contact 408 to a 5V standby power supply through a 10 K ohm pull-up resistor, such that the processor type contact 408 is pulled high to 5V standby when the processor receptacle is empty. The regulated voltage processors used in the preferred embodiment connect the processor type contact 408 of the processor receptacle 104 to ground, thereby pulling down the signal at the processor type contact from 5V standby to ground level. The direct voltage processors used in the preferred embodiment do not connect the processor type contact 408 to anything, leaving the signal pulled high to 5V standby (i.e., "floating" it). Thus, the signal at the processor type contact 408 of each of the processor receptacles 104 is high (5V standby) when a direct voltage processor is present in the receptacle or the receptacle is empty, and low (ground level) when a regulated voltage processor is in the receptacle. The signals at the processor type contacts 408 of the processor receptacles 104 are the second half of the input signals to the voltage module control circuit 110.

Voltage Module Control Circuit 110

The upper portion of FIG. 4 shows the voltage module control circuit 110. Four XOR gates 112a–d (collectively 112) receive inputs from respective processor receptacles 104a–d and voltage module receptacles 108a–d. The first XOR gate 112a receives as inputs the signals from the processor type contact 408 of the first processor receptacle 104a and from the voltage module type contact 406 of the first voltage module receptacle 108a. Similarly, the second, third and fourth XOR gates 112b–d receive as inputs the signals from the processor type contacts 408 of the second, third and fourth processor receptacles 104b–d, respectively, and the signals from the voltage module type contacts 406 of the second, third and fourth voltage module receptacles 108b–d, respectively. The output signals from XOR gates 112 are high (5V standby) if the inputs to each gate are opposite—one high (5V standby) and the other low (ground). If the inputs to one of the XOR gates 112 are the same, the output of that gate is low (ground). Opposite input signals to one of the XOR gates 112 indicate that the processor 102 in the gate's respective processor receptacle 104 is correctly matched with the appropriate voltage module 106 in the gate's respective voltage module receptacle 108. Equal input signals to one of the XOR gates 112, on the other hand, indicates a mismatch between the gate's respective processor 102 and voltage module 106. Thus, the output from each of the XOR gates 112 is high (5V standby) if its respective processor and voltage module match, and low (ground) if there is a mismatch between the gate's respective processor 102 and voltage module 106.

The outputs from the XOR gates 112a–d provide the inputs to AND gate 114, which outputs a high (5V standby) signal only if all four inputs to it are themselves high (i.e., only if there are no mismatches between the processors 102 and the respective voltage modules 106). A low (ground) signal output from AND gate 114 indicates a mismatch between one of the processors 102 and its voltage module 106. The output signal from AND gate 114 is provided as input to an open collector buffer 116.

Open Collector Buffer 116 receives and buffers the output signal from AND gate 114. If the output signal from AND gate 114 is high, open collector buffer 116 produces no output signal, thereby floating its output connection. However, if the signal from AND gate 114 is low, indicating that one or more mismatches exist between the processors 102 and their voltage modules 106, open collector buffer 116 outputs a low (ground) voltage validation signal corresponding to the low (ground) signal input to it from AND gate 114.

The voltage validation signal from open collector buffer 116 is connected to the processor presence signal from contact A165 of the fourth processor receptacle 104d. The voltage validation signal pulls the processor presence signal low (to ground) if a mismatch exists between one of the processors 102 and its voltage module 106, but does not affect the processor presence signal if no mismatches exist. This modified processor presence signal resulting from modification of the convention processor presence signal by the voltage validation signal is then conventionally provided to the system 100 to control power up of the processors 102.

Advantages over the Prior Art

The preferred embodiment of this invention modifies the processor presence signal produced by the processor receptacles 104 and processors 102 to signal not only the presence of processors 102 in processor receptacles 104, but also the presence of matching voltage modules 106 in respective voltage module receptacles 108 corresponding to the processors. The system 100 powers up the processors 102 only when the processors and voltage modules 106 present in the system are matched such that none of the processors can be damaged during power up. If one of the processor receptacles 104 is empty, the processor presence signal output from the fourth processor receptacle 104d is low (ground) and the output signal from open collector buffer 116 cannot pull it up to high (5V standby). If one of the voltage modules 106 is missing, the system is permitted to power up if all other processors 102 have matching voltage modules, because the processor having no voltage module will not be powered up and therefore cannot be damaged by the application of a mismatched power supply voltage.

The use of a direct voltage module 200 to replace the voltage regulation module 300 permits a single common design of the system 100 at times to use direct voltage processors 102 without a voltage regulation module, thereby reducing the cost of the system by the cost of the voltage regulation module, and at other times, to use using regulated voltage processors with matching voltage regulation modules. The voltage module control circuit 110 protects the valuable processors 102 from application of incorrect power supply voltages due to incorrect assembly of the system 100 by placement of mismatched voltage modules 106 in the voltage receptacles 108.

Alternative Embodiments

It will be appreciated that, although specific embodiments of the invention have been described herein for purposes of illustration, various modifications may be made without departing from the spirit and scope of the invention. In particular, the processors 102 may be other processors that have contact-compatible versions requiring different power input voltages. Further, the voltage validation signal can be applied to electrical components other than processors, again provided only that multiple, contact-compatible versions requiring different power input voltages can be used in the system. Further, the processors need not be removable, and the system need not include processor receptacles. Further, the system may have only a single processor and a single voltage module.

Similarly, voltage modules other than the direct voltage module 200 and voltage regulator module 300 can be used, provided only that multiple contact-compatible versions can be inserted into the same receptacle. For example, the invention could be applied where two different voltage regulator modules for powering the processors or other components could be inserted into the same receptacle. Further, the voltage modules need not be removable, and the system need not include voltage module receptacles.

Accordingly, the scope of protection of this invention is limited only by the following claims and their equivalents.

I claim:

1. A computer system comprising:
    a processor providing a processor type signal identifying a power input voltage required by the processor;
    a voltage module providing a power supply voltage to the processor;
    a voltage module validator responsive to the processor type signal and the voltage module representing whether the power supply voltage matches the power input voltage; and
    a power controller responsive to the voltage module validator.
2. The system of claim 1, further including a processor receptacle which removably receives the processor.
3. The system of claim 2, wherein the processor receptacle provides a processor presence signal; and
    wherein the power controller is further responsive to the processor presence signal.
4. The system of claim 1, wherein the processor is contact-compatible with a second processor which requires a second power input voltage.
5. The system of claim 1, further comprising:
    a second processor including a second processor type signal identifying a second power input voltage required by the second processor; and
    a second voltage module providing a second power supply voltage to the second processor; and
    wherein the voltage module validator is further responsive to the second processor type signal and the second voltage module.
6. The system of claim 5, wherein the second power input voltage is different than the power input voltage.
7. The system of claim 1, wherein the power input voltage is the same as a voltage of a power plane voltage of the system.
8. The system of claim 7, wherein the voltage module directly connects the power plane to the processor.
9. The system of claim 1, wherein the voltage module includes a voltage regulator.
10. The system of claim 9, wherein the voltage regulator is capable of providing two or more different voltages to the processor.
11. The system of claim 10, wherein the voltage regulator is responsive to the processor.
12. The system of claim 1, further comprising a voltage module receptacle.
13. The system of claim 1, wherein the voltage module provides a voltage module type signal; and
    wherein the voltage validation circuit is responsive to the voltage module type signal.

* * * * *